United States Patent
Periyalwar et al.

(10) Patent No.: US 7,218,891 B2
(45) Date of Patent: May 15, 2007

(54) MULTI-HOP INTELLIGENT RELAYING METHOD AND APPARATUS FOR USE IN A FREQUENCY DIVISION DUPLEXING BASED WIRELESS ACCESS NETWORK

(75) Inventors: Shalini Periyalwar, Nepean (CA); Yoon Chae Cheong, Kanata (CA); Nimal Senarath, Nepean (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 351 days.

(21) Appl. No.: 10/617,956

(22) Filed: Jul. 14, 2003

(65) Prior Publication Data
US 2004/0192204 A1    Sep. 30, 2004

Related U.S. Application Data (60) Provisional application No. 60/458,374, filed on Mar. 31, 2003.

(51) Int. Cl.
*H04B 7/185* (2006.01)
(52) U.S. Cl. ..................... 455/13.1; 455/11.1
(58) Field of Classification Search ............... 455/11.1, 455/13.1, 561, 574, 522, 446, 15, 428, 445
See application file for complete search history.

(56) References Cited

U.S. PATENT DOCUMENTS

| 6,718,160 B2* | 4/2004 | Schmutz ..................... 455/11.1 |
| 2002/0077151 A1* | 6/2002 | Matthews et al. .......... 455/561 |
| 2003/0124976 A1* | 7/2003 | Tamaki et al. ................ 455/15 |

OTHER PUBLICATIONS

Dohler et al, Center for Telecommunications Research King's College London, "Space-Time Block Codes for Vitual Antenna Arrays", PIMRC 2002, IEEE pp. 414-417.

* cited by examiner

*Primary Examiner*—Edward E. Urban
*Assistant Examiner*—Tu X. Nguyen
(74) *Attorney, Agent, or Firm*—Jeffrey M. Measures; Borden Ladner Gervais LLP (57) ABSTRACT

A multi-hop relaying method and apparatus used in a cellular network. The multi-hop transmission scheme utilizes intelligent relays within a conventional cellular system having at least one base station, one or more intelligent relays, and user equipment elements. The method includes selecting the strongest pilot signal from among the base stations and intelligent relays, reporting such to the base station, distributing an active user list to the relays along with scheduling and routing information via a relay control channel, and transmitting data according to a respective active user based upon the pilot signal strength to maximize coverage and capacity over the cellular system.

4 Claims, 9 Drawing Sheets

MULTI-HOP INTELLIGENT RELAYING METHOD AND APPARATUS FOR USE IN A FREQUENCY DIVISION DUPLEXING BASED WIRELESS ACCESS NETWORK

RELATED APPLICATIONS

The present application claims priority from U.S. Provisional Application Ser. No. 60/458,374 filed Mar. 31, 2003.

BACKGROUND OF THE INVENTION

1. Field of the Invention

The present invention relates to the field of relaying within a frequency division duplexing (FDD) based cellular communications network designed for packet transmission. More specifically, the present invention is a method and apparatus involving a multi-hop transmission scheme utilizing intelligent relays to maximize coverage and capacity over a conventional cellular system designed for packet transmission.

2. Description of the Prior Art

Multi-hop relaying and ad-hoc networks are emerging as popular options to enhance the coverage performance of packet-based wireless networks. The basic idea of such networks is that the users in locations with poor wireless environments get their data from nearby wireless entities in the same cell, such as peer mobiles, moving vehicular devices, or devices at fixed locations, rather than directly from the serving base station. The entities that deliver the data to the end users are called relays. Relays perform communications between the base station and the end-users, or even between users. Some such multi-hop relaying and ad-hoc networks may exist even without centralized nodes such as base stations.

Figure 1:
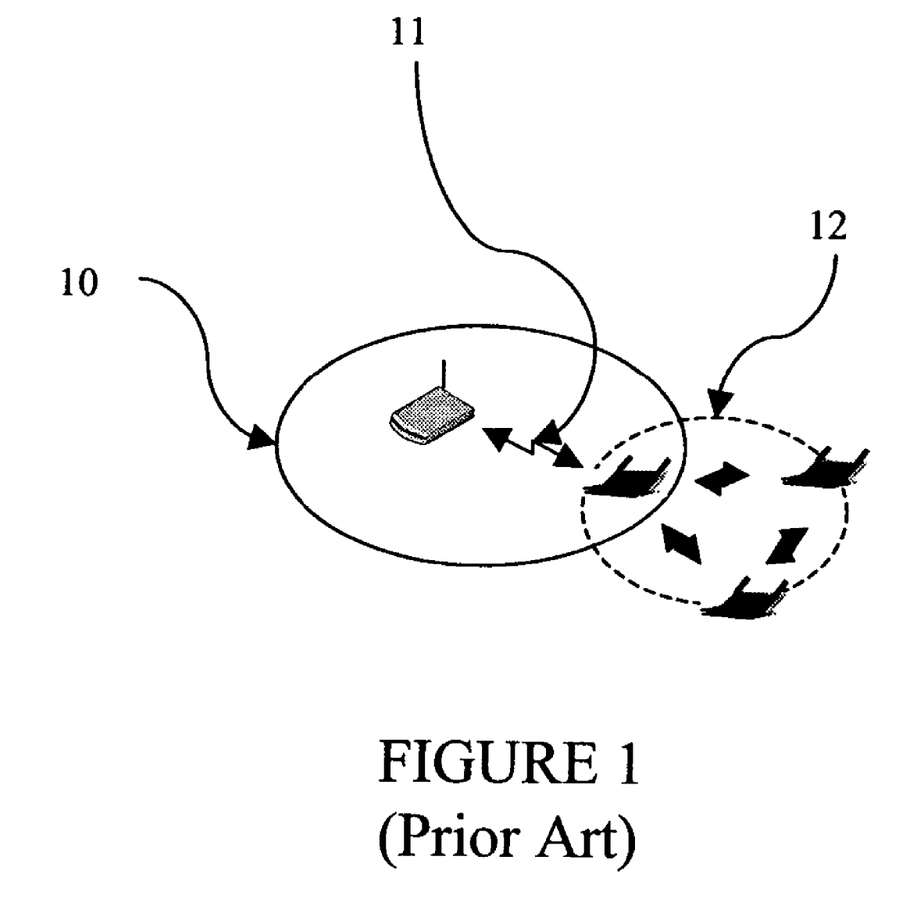
FIG. 1 is schematic showing a prior art a pure ad-hoc network.

Known ad-hoc networking includes examples such as virtual personal distributed networks, interoperability with fixed/overlay networks, and multi-hop augmented infrastructure based networks. Virtual personal distributed networks involve standalone networks with capability for peer-to-peer connectivity that can also be connected to outer networks through a backbone gateway. Such a scenario is also called a pure-ad-hoc network 10 as seen in prior art FIG. 1 with peer-to-peer connections 11. Typical examples of such networks include military packet radio networks, personal area networks (PAN), network of sensors, home networks, vehicular networks, and wireless local area networks (WLAN) (as shown in FIG. 1 as element 12).

Figure 2:
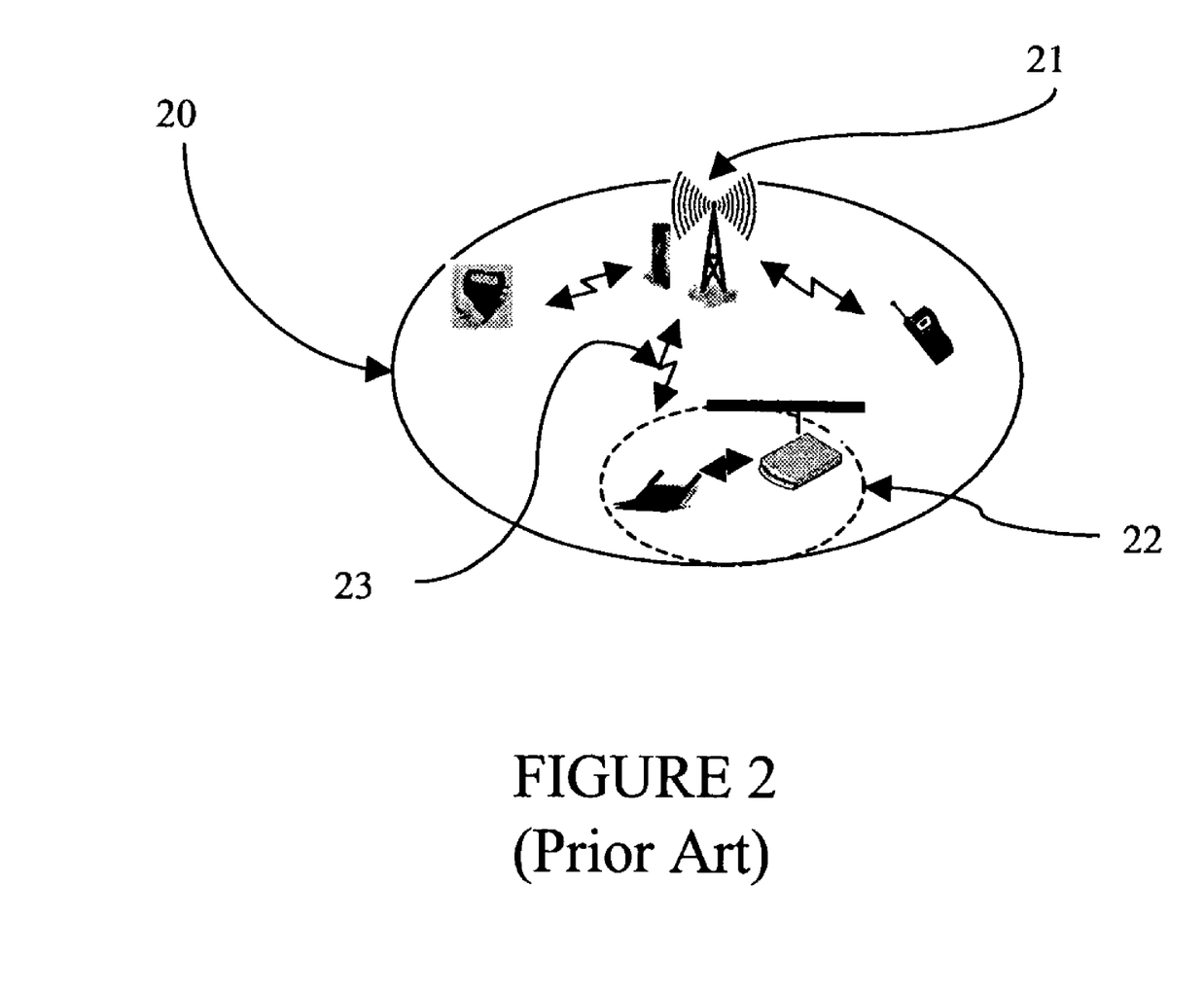
FIG. 2 is a schematic showing a prior art combination of ad-hoc networks with fixed/overlay networks.

The second known example as shown in prior art FIG. 2 is the combination of ad-hoc networks with fixed/overlay networks. This can be regarded as a heterogeneous network 20 supporting dual air interfaces by a single user terminal, such as a WLAN 22 overlaid by a cellular network 21. The general coverage is given by the cellular network 21, with the addition (shown by link 23) of "hot spot" high data rate coverage by WLAN 22.

Figure 3:
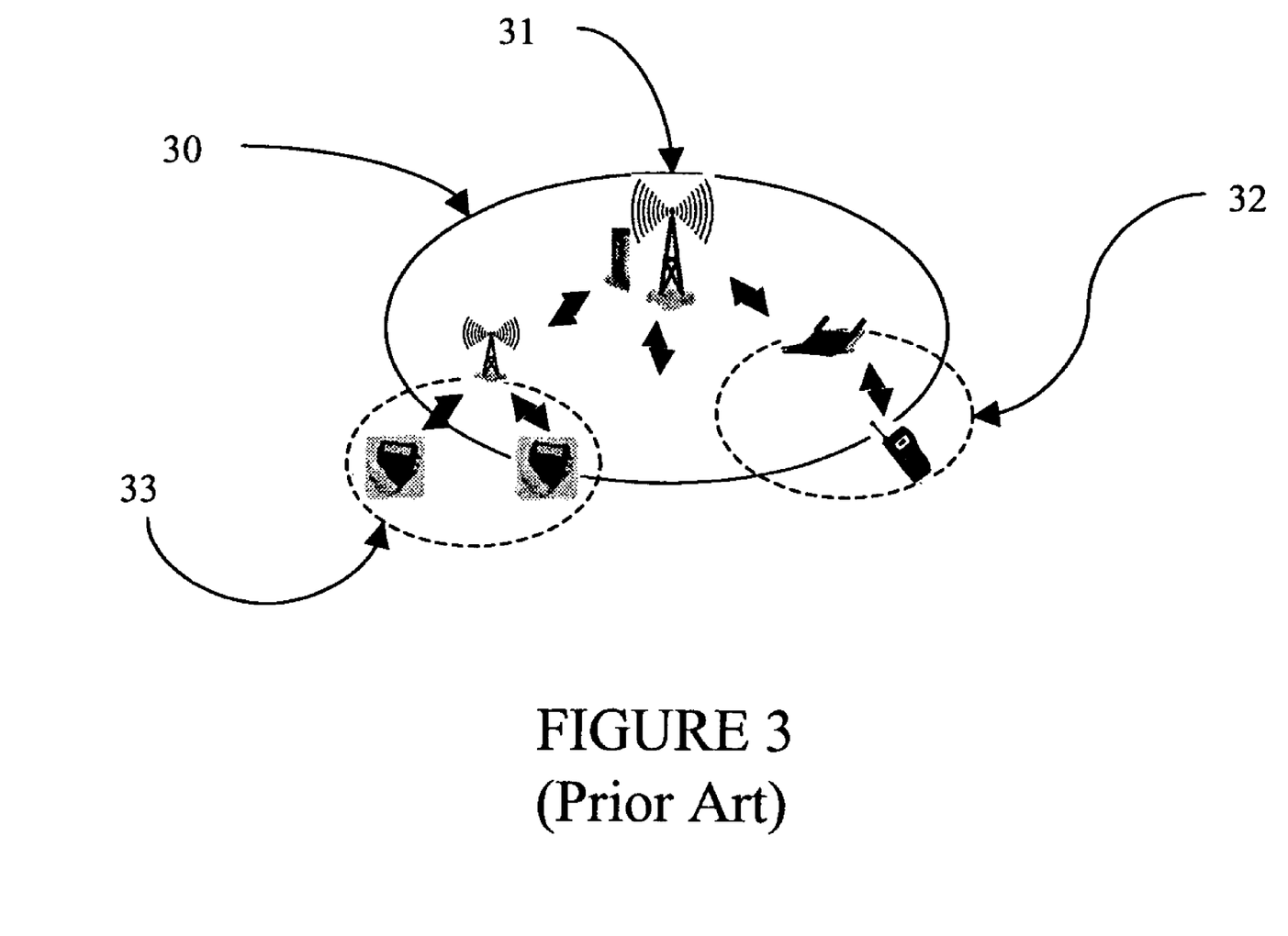
FIG. 3 is a schematic showing a prior art single air interface network with coverage extension through relays sharing the resources in the same cell.

The third known example as shown in prior art FIG. 3 is basically a single air interface network 31 with coverage extension through relays sharing the resources in the same cell. This relaying can be performed either through peer terminals ("peer-to-peer relaying") 32 or fixed nodes installed as a part of infrastructure ("fixed seeds relaying") 33. If relaying were done through peer terminals, there would be several issues such as security and egoism. Basically, peer-to-peer relaying relies on using other terminal's power to deliver a specific user's data. Therefore, what portion of terminal battery power should be used for others would be a serious issue, both for technical and business reasons. Moreover, security is another concern in adopting peer-to-peer relaying. Infrastructure-based relaying such as fixed relay nodes would resolve these issues, but it requires additional cost to the system for many relay nodes Infrastructure based fixed relays may be configured in various ways. They may exist in FDD mode or time division duplexing (TDD) mode and may utilize different spectrum for the base-relay link vs. the relay to user equipment (UE) link. In the FDD mode, they may employ the same FDD spectrum to minimize the transceiver hardware requirements. In this case, the need to share the FDD spectrum between the two links (BS-relay; relay—UE) results in a reduction in overall system capacity. Further, the interference caused by the relay nodes transmitting in the same frequency band as their peers as well as any needs of the base station (BS) required to be managed.

Figure 4:
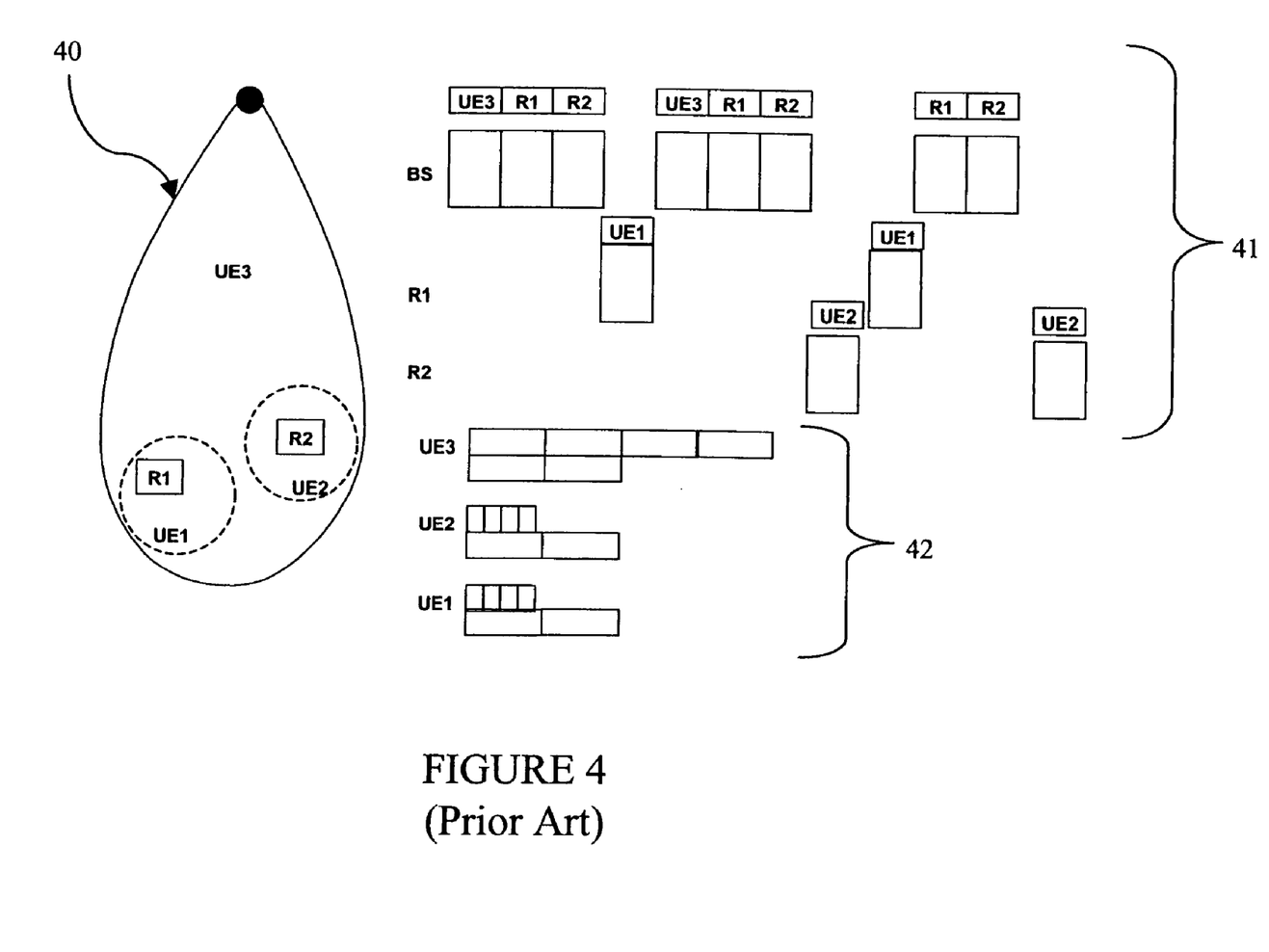
FIG. 4 illustrates the concept of conventional cellular without a relay and illustrates the problem of providing uniform coverage to users with varying channel conditions.

FIG. 4 illustrates the concept of conventional cellular 40 without a relay and illustrates the problem of providing uniform coverage to services with varying needs. In this case all time slots are allocated for BS-UE transmission 41, 42; however the efficiency of usage of the timeslots varies depending on the BS-UE link. Capacity is optimized by delivering data to the UE with the best rates, while also considering fairness in servicing UEs in the entire cell. This latter requirement impact the achievable capacity in that distant UEs require more timeslots to receive the same data at a lower rate.

Figure 5:
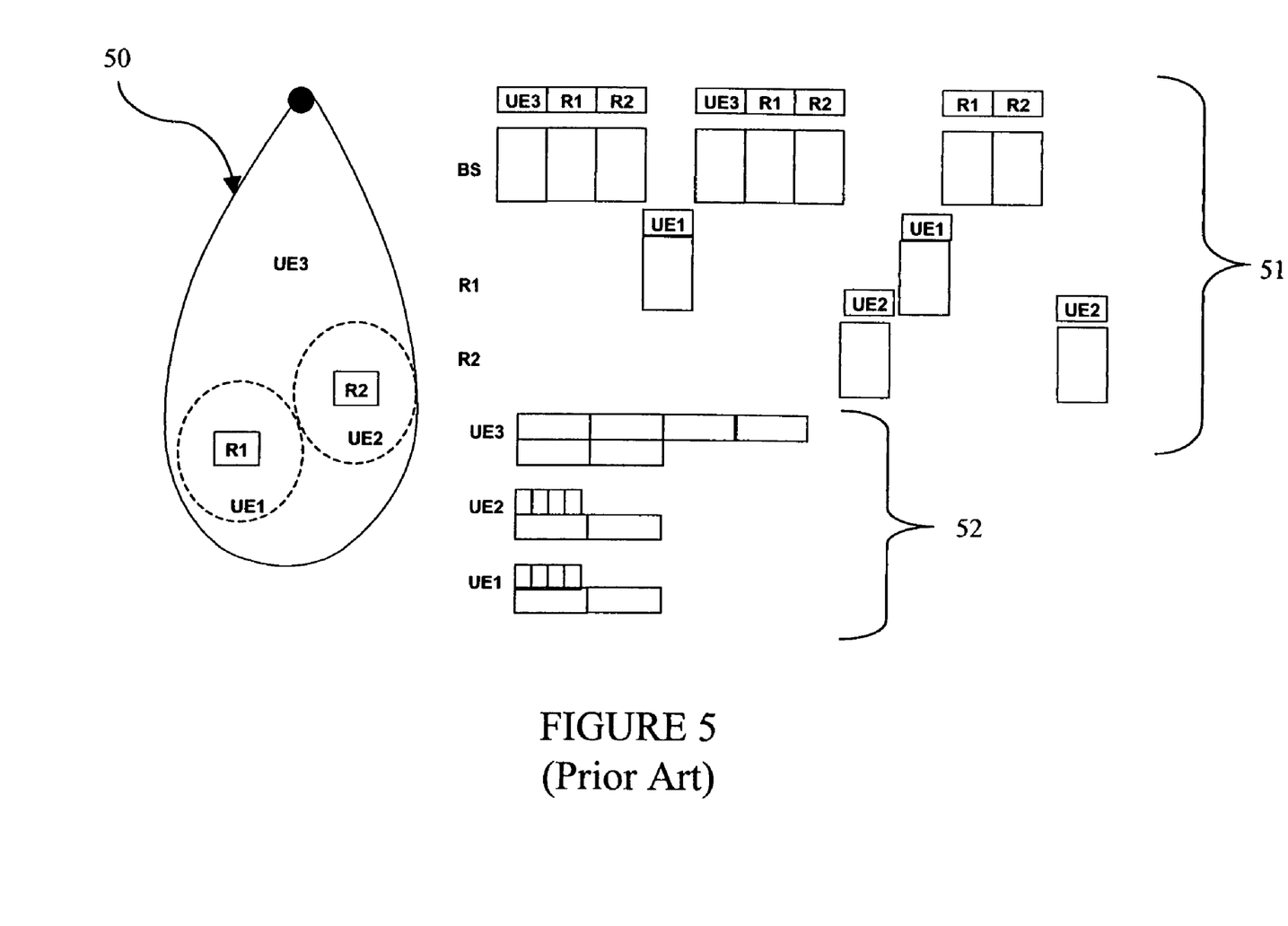
FIG. 5 illustrates the conventional application of multihop relaying. As shown in the figure, the available time slots are distributed between Base station and relays, with no facility to achieve simultaneous transmission, but showing the ability to increase the coverage over a conventional cellular system.

FIG. 5 illustrates the conventional system 50 of multihop relaying. As shown by the transmission representation 51, 52, the available time slots are distributed between the BS and relays, with no facility to achieve simultaneous transmission, but showing the ability to increase the coverage over a conventional cellular system. In the basic assumption of the system, a fat pipe downlink with adaptive modulation and coding is used to enable communications for a range of services. No power control is employed (e.g., HSDPA). Scheduling and routing is performed at the BTS. Coverage may be improved but there is a potential aggregate capacity hit (at best no improvement) due to timeslots not being shared between the hops. However, it may be assumed that relays have on-overlapping transmit areas and are capable of simultaneous transmission.

What is needed therefore is an efficient, cost-effective multi-hop manner of FDD based relaying for eliminating the "coverage holes" within packet based cellular networks, while simultaneously optimizing capacity.

SUMMARY OF THE INVENTION

The reference cellular system is assumed to be of FDD mode, and providing packet based communications. The communication may be performed in a rate-controlled manner (as with current 3GPP's HSDPA and 3GPP2's 1XEV configurations). In such a reference scheme, the transmissions from the BS are at full power, with adaptive modulation and coding (AMC) being employed for rate control to scheduled users. The scheduler in such a system could be designed to schedule those active users whose channel conditions permit transmission at the best possible data rate relative to other users seeking transmission. In a rate-controlled system, the rates available to the user closer to the BS are higher than the rates available to the user at the cell edge. Also, such systems employ aggressive frequency reuse, since they attempt to maximize the peak rates to the favourable users and provide lower rates at the cell edge where the interference is worst. In such systems, the proposed invention intends to provide higher rates at the cell edge with the introduction of intelligent relays.

The present invention provides a multi-hop relaying method and apparatus for use in a cellular network that will substantially eliminate "coverage holes" within network cells, while also making the best use of the frequency spectrum so as to improve capacity. The apparatus according to the present invention is in the form of an intelligent relay. An important novel aspect of the present invention is that fixed intelligent relays utilized as multi-hop extensions within the FDD macro-cell would deliver higher coverage with minimal changes to the BS and the user equipment (UE)—i.e., cellular terminals, mobile PDAs, . . . etc.

In a frequency division duplexing (FDD) system, fixed relaying implies the need to share the same frequency band in a time-division manner for transmitting between a BS-relay and relay-UE. A fundamental problem raised by this model is the issue of interference generated by the transmissions from the relays. This problem limits the realizable capacity while improving coverage. In a high reuse FDD system, as with most current cellular systems, the only option for relaying within a single air interface is in an FDD/TD mode, if the desire is to make changes only to the infrastructure and not to the UE or to the existing air interface. In this mode, transmissions from the base station and the relay are required to alternate so as to minimize the interference. Further, 3G systems employ adaptive modulation and coding strategies to maximize the delivered data rate, and deliver signals at constant transmit power. There is however no constraint on power control being applied at the base station.

The amount of time spent in transmissions between the BS and the relay, and thereon, from relay to the UE is determined by the volume of traffic on the two hops. Simultaneous transmission on these two hops is not possible unless some interference management strategy is employed. In this invention, this problem is addressed with a combination of power control and AMC, as well as with simple directional antennas and intelligent scheduling to meet the QoS needs of the user, while simultaneously maximizing the usage of the spectrum. The invention also proposes a solution to enable the transmissions between the two hops (BS-relay; relay-UE) to have varying rates to maximize capacity.

Problems inherent to sharing the same frequency between BS-relay and relay-UE are alleviated via the intelligent relays according to the present invention when used in an FDD system, with sectorization, intelligent combination of power control and rate control on the BS transmission, and QoS routing. In the conventional cellular architecture, there is no gain to be had by implementing power control in a rate-controlled system design. In the specific case of multihop relaying, however, it is advantageous to implement co-ordinated power and rate control to allow simultaneous transmission between BS and nearby UE, and between relay and distant UE.

The present invention provides many advantages including a reduction in the distance to reach another entity in the network. This aspect further provides for a reduction of the transmission power, especially from user terminals, so as to promote system efficiency. As well, this contributes to an increase of terminal battery efficiency and a decrease of interference to the receivers in the base station (BS).

On the downlink side, the intelligent relay according to the present invention in combination with an existing BS can convey higher data rates than the BS alone. This is due to the shortened propagation distances producing wider coverage of high data rate services. Accordingly, this is very helpful in covering the "hot spots" and the "coverage holes" within network cells.

Because the intelligent relays can act as alternative routing nodes to user terminals, this creates flexibility within the system in terms of being adaptive to environmental change. For example, when the quality of the existing link to a terminal deteriorates, another relay with better link quality to the user can be selected and the traffic can be automatically and seamlessly re-routed. If the inventive intelligent relays are located in overlapping areas of different cells, balancing of traffic load between cells is possible. In addition to load balancing, the present invention is also useful in reducing the path vulnerability. Improvements in coverage of a cellular system and at the cell edge are thereby possible through the present invention.

The intelligent relay of the present invention is well suited to multiple input multiple output (MIMO) and enables extending the MIMO channel towards the periphery of the cell. Further, the introduction of intelligent relays within the macro-cellular architecture will help simplify the terminal complexity with fewer antennas needed to achieve a given user rate. With the possibility of a stronger signal being available over a larger area of the cell, the utilization of MIMO over the cell area would also be improved.

With the introduction of intelligent relays in the macro-cellular architecture, it becomes necessary for the UE to monitor the intelligent relay's signal strength as well as that of the BS. This introduces the need for a relay pilot.

The relay is also required to communicate with the BS and with the UE. This introduces the need for a relay control channel.

Further, with intelligent use of the BS and intelligent relays in conjunction with the quality of service (QoS) needs of the data to be transmitted,—i.e., by selecting either a direct BS-UE connection (e.g., low rate, low delay services) or a multi-hop intelligent relay connection (e.g., best effort services) as appropriate—it is apparent that the system functionality can be optimized. In addition to such QoS enabled routing, another beneficial aspect of the present invention includes interference reduction.

Accordingly, the inventive intelligent relays in conjunction with MIMO will lead to realization of ubiquitous service coverage in macro-cellular systems.

DETAILED DESCRIPTION OF THE INVENTION

The invention will be described for the purposes of illustration only in connection with certain embodiments; however, it is to be understood that other objects and advantages of the present invention will be made apparent by the following description of the drawings according to the present invention. While a preferred embodiment is disclosed, this is not intended to be limiting. Rather, the general principles set forth herein are considered to be merely illustrative of the scope of the present invention and it is to be further understood that numerous changes may be made without straying from the scope of the present invention.

Figure 6:
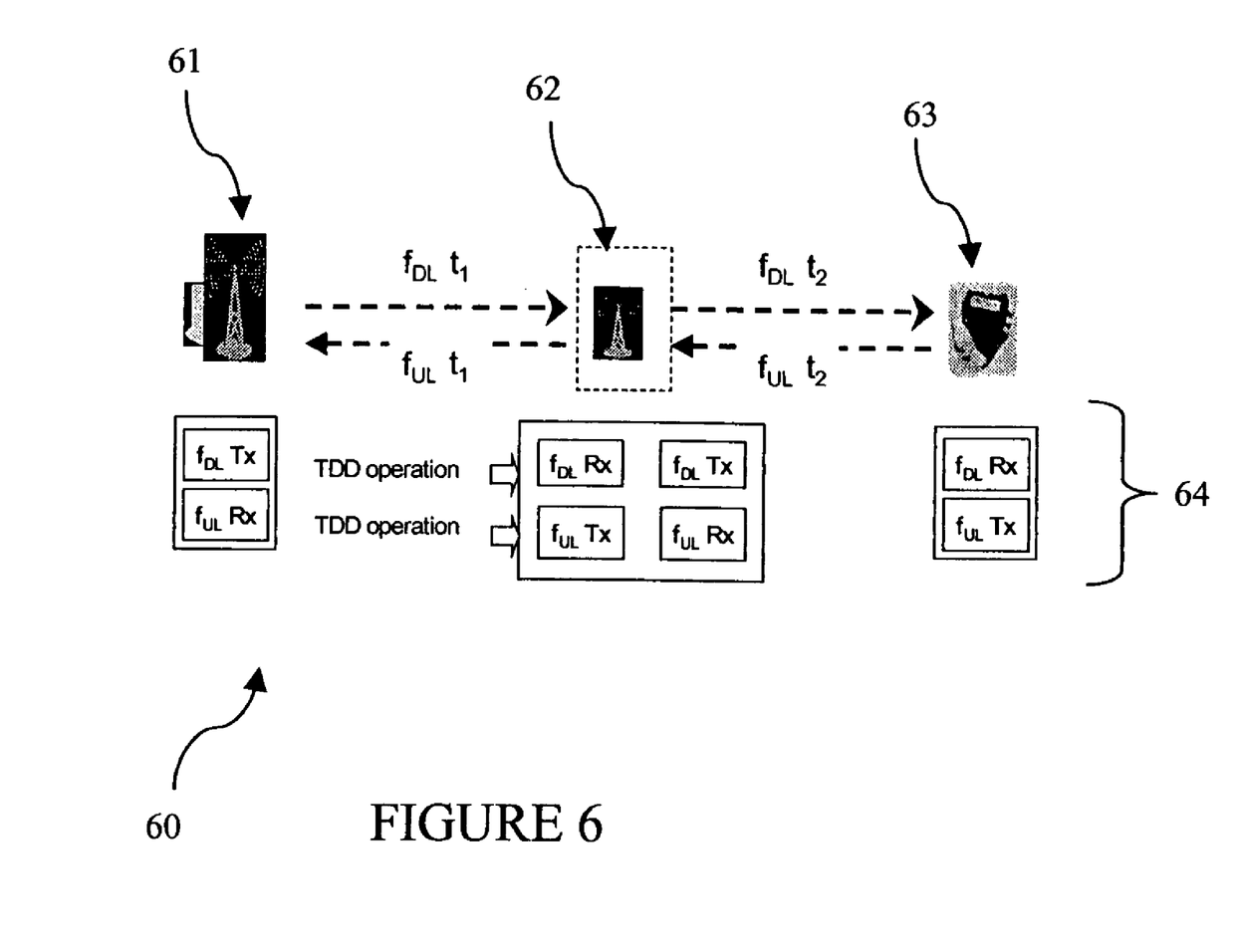
FIG. 6 is a schematic of the intelligent relay according to the present invention and includes two different transceivers in each of the downlink and uplink paths.

With reference to FIG. 6, a schematic is shown indicating a BS 61, a UE element 63, and an intelligent relay 62 in accordance with the present invention located between the BS and UE element. In this fixed relaying configuration 60, for the FDD mode, hopping operation 64 is done through intelligent relays. While this would suggest an increase of infrastructure cost, it should be noted, however, a time division (TD) mode of operation will minimize any additional hardware circuitry in the terminal thereby reducing the terminal cost. Within FIG. 6 as illustrated, the intelligent relay includes transmitter and receiver circuitry for both directions. However, the complexity of the BS and the UE elements remain relatively unchanged. While the control functionality to operate the base station and terminal in the time division mode should be added, the hardware complexity of BS and UE element is not increased. It should be noted that this is in sharp contrast to prior art relaying such as through "peer-relaying" where each and every terminal needs to have the capability to deliver data traffic from other terminals as well as from the BS. Further, the mobility of terminals adversely weakens the stability of the relaying path and the coverage performance would be dependent on the density of terminals in the same cell. In intelligent relaying according to the present invention, the nodes are carefully located considering factors such as the need for high-speed data or the existence of deep shadowing spots.

As shown in FIG. 6, the intelligent relay includes two different transceivers in each of the downlink and uplink paths. This gives rise to the issue of choosing appropriate levels of adaptive modulation and coding (AMC). Because the modulation and coding level is determined by the channel condition, measurements are required to find the right level for each of the links. The downlink relay receiver measures the channel quality of the link from the BS to the intelligent relay. Likewise, the UE receiver does the channel quality measurement of the intelligent relay to UE link. These measurement data are then delivered to a controller or scheduler to select the corresponding modulation and coding level for each of the hops.

A pilot channel carries the information to identify the base station transmitters, such as sectors and beams, as well as the relays. The relays measure the pilot channels of the base stations and the UEs measure the pilot channels for the base stations as well as for the relays. These measurements are reported to the base station, where the UE's active set is updated with both BS as well as relay information. A relay control channel is introduced in the design for the communications between the relay, BS, and UEs.

Selection of the AMC may be done at the transmitter of each portion of the link or at the BS without straying from the intended scope of the present invention. In the former case, the intelligent relay needs to have more capability to process the channel measurement. On the other hand, the relay may pass the data to the UE at the same AMC level as received from the base station. In such a case, the selection of the AMC level could be done at the BS, as the minimum of two rates corresponding to each portion of the link, and the channel measurement report from the terminal does not have to be known to the relay, but would be sent directly to the BS.

Performing L1 HARQ in the presence of relays presents an issue of whether the relays should be transparent to the L1 HARQ process. When a physical layer frame is found to be in error by the receiver layer 1, the receiver sends a L1 NAK to the transmitter so that the full or partial information of the erred L1 frame is retransmitted. Typically, the retransmission needs to be done within a few frame periods due to the limitation in the buffer size at L1 circuitry. If the relay is between the BS and the UE, then L1 frames, L1 NAK frames, and retransmitted frames would suffer additional delay due to the hopping because the hopping has to be implemented in a time division manner.

The present invention overcomes this in two ways so as to implement L1 HARQ in the intelligent relaying. The first is to perform L1 HARQ only between the BS and the UE as described above. The relays would be transparent to the L1 HARQ process, which would help make the relay structure simpler but with more delay in the transmission of L1 frames. The second way is to apply L1 HARQ separately to each hop of the link: independent L1 HARQ for the BS-relay hop and the relay-UE hop. In this case, the relay acts as a terminal to the BS and also as a BS to the UE. The BS transmits L1 frames to the relay and the relay sends NAK for erred frames. Then, the relay would send L1 frames to the UE and retransmit the frames if the UE sends a NAK. Thereby, the L1 process for each hop can be handled separately so that the delay for each hop can be controlled. Even though the global delay may not be improved, the requirement for L1 retransmit buffer at the BS would be reduced since the time to keep the L1 frames for retransmission is shortened. In short, the choice of L1 HARQ options with intelligent relaying is a compromise between the simplicity of the intelligent relay's L1 circuitry and the delay performance of L1 HARQ.

As in the case of L1 HARQ, there would be two options concerning layer 2 ARQ. L2 ARQ can be performed at the BS only or at the BS and a relay independently. The issues on delay and the buffer size would apply as for L1 HARQ, but with different implication in that L2 has less restriction on the delay requirement due to the retransmission buffer size. This means that having the L2 ARQ function at the intelligent relay is not particularly beneficial, while it is so in case of L1 HARQ, by reducing the buffer requirement through faster transactions as explained earlier.

In order to find the best route to a UE, the channel quality information on the BS-relay hop and the relay-UE hop needs to be measured. Thereafter, a scheduler or routing algorithm uses the quality of the measured channel. Depending on where these algorithms are located, the measured channel quality information needs to be delivered to the appropriate entity such as the BS or the intelligent relay. Where to locate the scheduler and routing algorithm is not considered critical to the present invention, though they would typically be located within the BS if the number of intelligent relays were not large. However, with many intelligent relays and more than two hops, it may be worthwhile to consider letting the intelligent relays decide the forwarding path to reduce the computational burden at the BS. Further, measuring the channel quality for each hop would require separate pilot signals for each hop. When the number of intelligent relays required in a cell is large, then the total number of pilot signals may be an issue for a system designer.

With multiple intelligent relays in a cell, there can be multiple paths to reach from the BS to a specific UE. A routing algorithm selects the best path to the UE based on various factors such as: maximum C/I vs. minimum number of hops (QoS enabled routing); and relay buffer status (overflow prevention)

In order to maximize the throughput and the hop efficiency, each hop should be able to deliver its maximum possible data rate. This is accomplished via QoS enabled routing by selecting the path that shows the best channel quality. However, if the delay requirement of the data to be delivered is quite tight, it may be necessary to find the shortest path (minimum number of hops) to reduce the delay as each hop contributes to the total delay in the current assumption of time division hopping. This can be adaptively used depending on the QoS requirement of the traffic flow.

In overflow prevention, each intelligent relay has a certain amount of buffer to store the data received from the BS until it is scheduled to be transmitted. The routing algorithm then must consider the buffer occupancy of each intelligent relay node in the coverage so that the traffic may be redirected to the second best path if the intelligent relay buffer in the best path is about to overflow.

Figure 7:
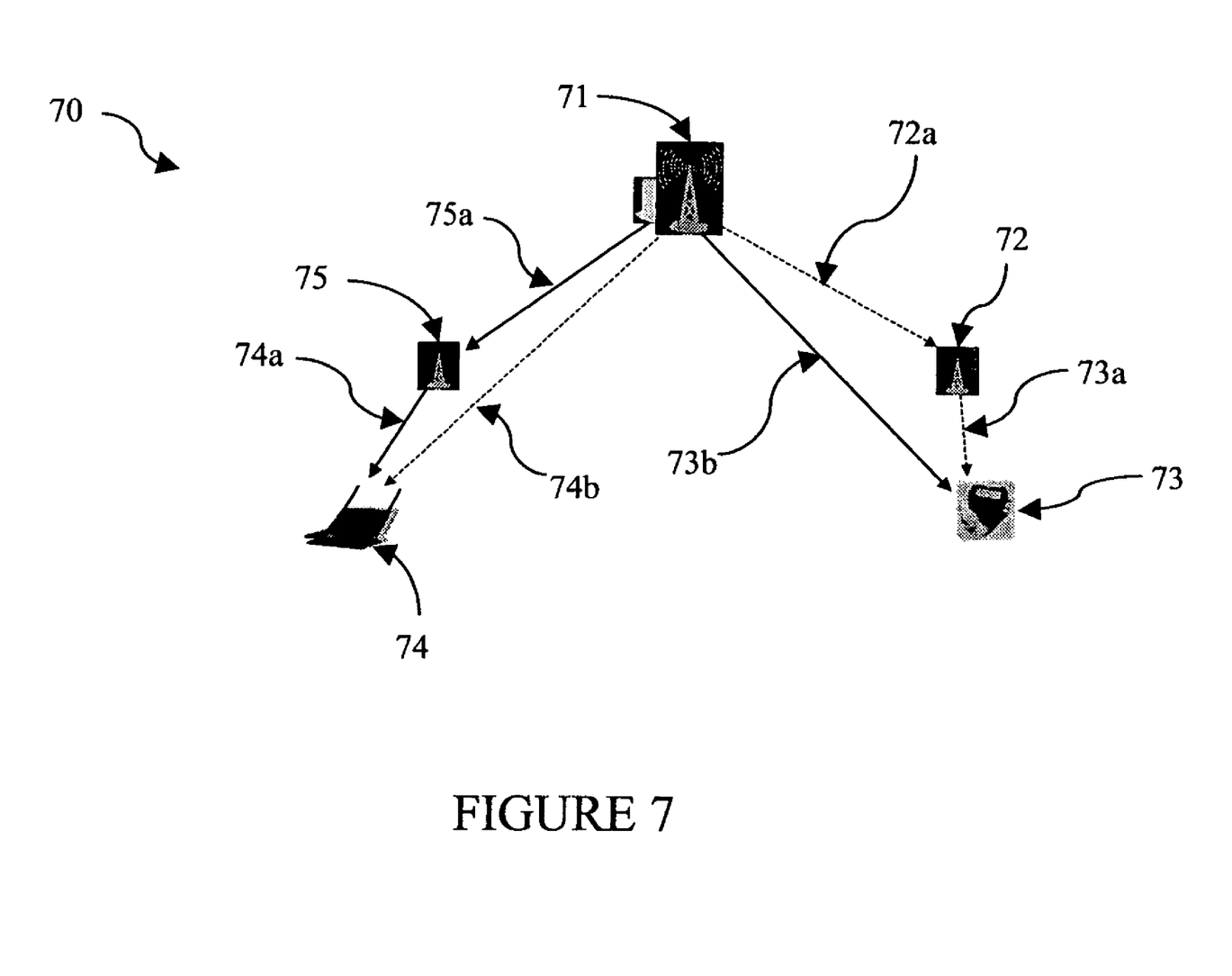
FIG. 7 is a schematic showing an example of intelligent relaying with different QoS requirements.

Relaying within the FDD/TD mode inherently introduces delay due to the store-and-forward nature of a relay. Typically, this would be problematic when the data packets are from an application that has a very tight delay requirement, such as interactive voice. In such instance, the shortest path may be chosen instead of the path with the biggest throughput. If delay is not a concern, then the maximum throughput path would be selected. Thus the routing in intelligent relaying can meet the QoS requirement of different users/applications by incorporating the requirement into the routing decision. FIG. 7 shows an example of intelligent relaying 70 with different QoS requirements.

Suppose UE A is downloading a file via FTP and UE B is running an interactive voice application. For simplicity it is assumed that any hop would incur the same delay, and the AMC levels for the hops are different between the direct path and the relayed path. In FIG. 7, it should be understood that the values shown for AMC levels and the delay are given merely for illustrative purposes and should not be considered to limit the present invention. For each UE 73, 74, there could be two choices of paths: a direct path 73b, 74b from the BS 71 and a path collectively 72a, 73a or collectively 74a, 75a through the intelligent relays 72, 75, respectively. The router at the BS, in this example, decides different routes depending upon the delay and throughput requirements. Voice packets to UE 73 go through the direct path 73b to satisfy the tight delay requirement of the voice application, but the packets being downloaded to UE 74 are routed through the intelligent relay 75 because it provides higher throughput.

A scheduling algorithm determines when the current data unit is to be transmitted through a path designated by the routing algorithm. Like the routing algorithm, there are many factors that affect the scheduling decision including: possible maximum data rate; delay and guaranteed minimum rate (QoS of traffic and user); fair distribution of throughput among users; and interference reduction from another intelligent relay or the BS.

As with the conventional schedulers, scheduling with intelligent relaying should take the maximum data rate as one of the important criteria. Transmission from an intelligent relay can be such that the user with maximum rate at the moment may be scheduled, which is the same as the scheduling at the BS. This would require buffers in the intelligent relay because the data may have to wait until it is scheduled. As stated before, this buffer occupancy may affect the routing decision as well.

QoS of traffic and user are also a concern. Delay sensitive data traffic such as real-time services would need to be scheduled with priority. Performing this QoS scheduling with relaying are decisions preferably made at the BS level, but are also possible at the intelligent relay level.

Handover to other intelligent relays occurs when a UE moves in a cell and the best path to the UE changes dynamically. The routing algorithm tracks the change of metric to update the decision for the best path to a specific UE. If necessary, the handover to neighbouring intelligent relays within the BS's domain is handled by the routing algorithm. This is done by keeping track of the channel quality measurement data for each UE, both from intelligent relays and the BS for all members of the extended active set (BSs and associated relays)

In addition to the surrounding cells, the intelligent relays in those cells become another source of interference to any terminal. Even though the actual impact of the interference would not be proportional to the number of intelligent relays, as the BS's and intelligent relays are not always transmitting due to their TD hopping operations, the transmission from each intelligent relay is carefully scheduled to minimize the amount of interference.

Figure 8:
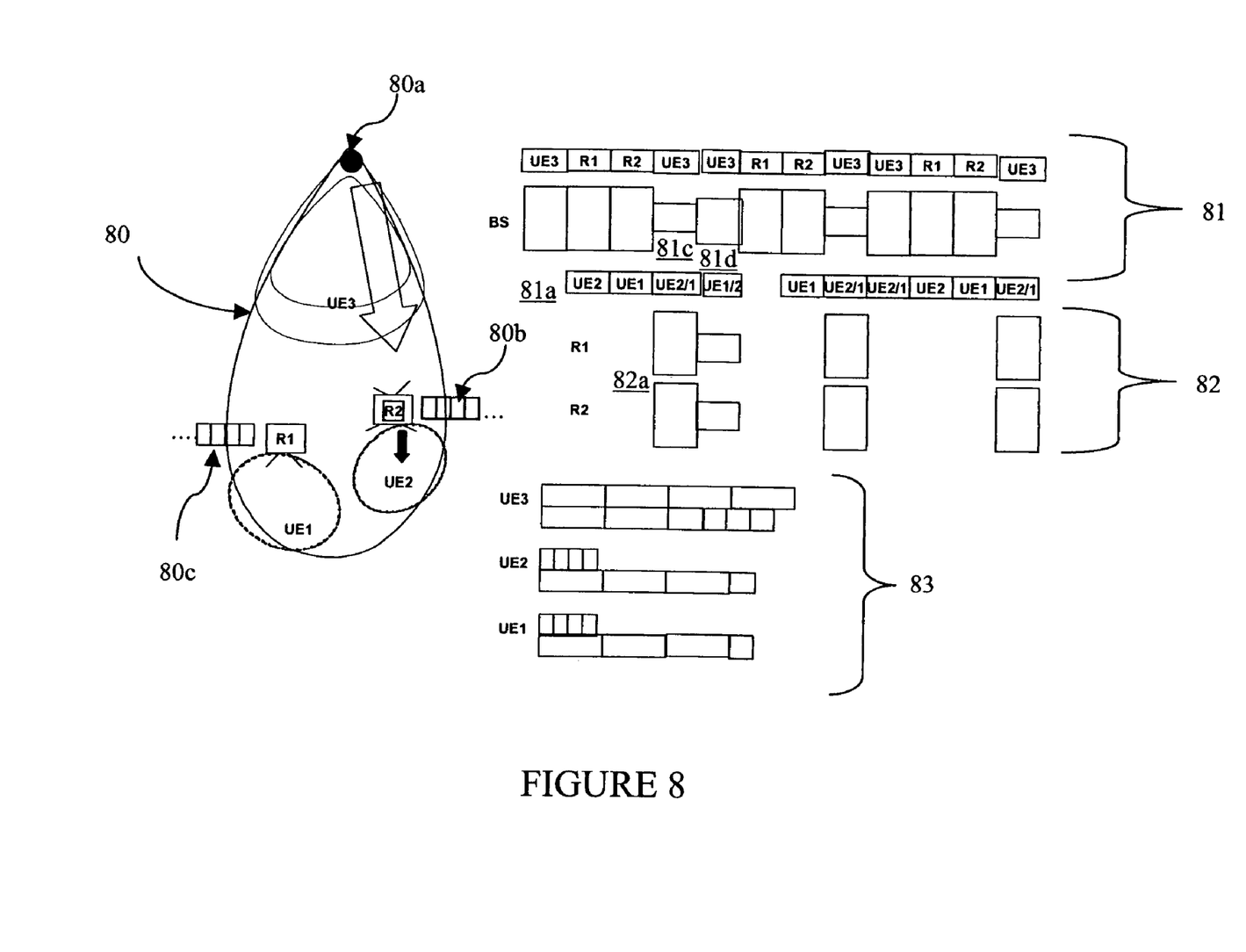
FIG. 8 is a schematic showing an example of intelligent relaying with sectorization to manage interference, power and rate controlled Base station transmissions, and QoS enabled routing.

Typically, the BS and relay transmissions are separated as shown in FIG. 8. This mode of operation impacts the capacity (throughput) of the system while improving coverage. It is desirable to retain the system capacity obtained without the relay configuration, while simultaneously improving coverage.

FIG. 8 is a schematic showing an example of intelligent relaying with sectorization to manage interference, power and rate controlled BS transmissions, and QoS enabled routing. It illustrates the application of the invention with the following enhancements:

a. power control of selected transmissions in addition to rate control;
b. a simple sectorized relay with sector transmit and sector receive as illustrated;
c. a Relay transfer buffer to handle the variable rate traffic pipes between BS-relay and relay to UE; and
d. intelligent QoS scheduling to maximize use of available spectrum at both BS and relay.

This requires the introduction of power control as an overlay to the rate-controlled system design. While, traditionally, the rate-controlled BS operates at full power, this invention proposes that the BS also be able to operate at lower power levels, so as to be able to transmit at a lower rate, when the relay link is in operation. In the sector 80 illustrated in FIG. 8, simultaneous transmission 81, 82 over the two hops is made possible in the following ways: As shown at reference 81d, while BS 80a transmits to R1, R2 can transmit to UE2 at a lower rate. As shown at 82a, while R1 and R2 transmit to their respective UEs, BS can transmit to nearby UE3 with power control (at a lower rate than without power control, but still making use of a previously unused slot) as shown at 81c to minimize interference for the relay to UE transmissions. As shown at 81a, the BS can alternately choose to advise relays to be silent while transmitting to UE3 and other nearby UEs—this decision is based on whether the relays have data to transmit and on the QoS needs of UE3 versus needs of UE1 and UE2. As shown at 81d, rates of transmission between BS to UE3 and relay to UE vary according to QoS and buffer conditions; this is handled through a relay transfer buffer 80b. While the BS is transmitting in the timeslot allocated to UE3 at a lower power level, UE1 and UE2 can be serviced by the relays at some lower rates. R1 also includes such a buffer 80c. Based on buffer status at relay, BS can decide to throttle its local transmission to UE3 with power control and service the relays. As shown at 83, there is a capacity improvement that ensues with such transmission (top blocks for conventional cellular, bottom for new multihop).

At the BS, some software changes are needed to
a. Allow power control along with rate control
b. Update UE's active set with both BS and relay pilot powers measured
c. Changes to scheduler and QoS routing features to allow relay to UE path
d. Interact with relay on the relay control channel At the UE, some software changes are needed to
a. Measure relay pilot powers
b. Interact with relay on the relay control channel Based on the discussions already mentioned above, the following is a list of basic functionalities in the intelligent relay within FDD/TD operation:
a. RF H/W with smaller transmission range than BS, L1 Modem H/W
b. MAC framing and addressing for each UE
c. C/I measurement and reporting capability
d. Keeping and updating the list of active UEs within the range
e. Intelligent relay identification at UE: relay pilot channel required
f. Updating the BS and UE: relay control channel required
g. Communication capability with BS, UEs, and other intelligent relays within the BS' domain, if necessary
h. Synchronization between BS, intelligent relay, and UE In addition to above functionalities, many other functions such as AMC, L1/L2 ARQ, scheduling/routing, etc. can be located either in the BS or the intelligent relay depending upon the system requirements. Overall, the important aspects of intelligent relaying include minimal change in the current design of the air interface, minimal change in the BS RF/L1 design that advantageously saves the HIW cost, and maximum possible performance improvement.

It should be recognized that the intelligent relay includes a set of selected control functionalities to be adaptive to the local change of the environment. Most of the L1 functions are performed at the intelligent relay level and the L2 functions are split between the BS and intelligent relay. The intelligent relay in accordance with the present invention minimally affects BS design and the air interface and can in fact enhance existing schemes such a MIMO. MIMO antenna configurations are proven to increase system capacity remarkably, together with the related requisite sophisticated channel allocation scheme and receiver structure. However, even though higher order MIMO (e.g., 4×4) can greatly improve system performance, this requires a large number of antenna elements in the terminal unit, which would impact the form factor and cost of the terminal. Even for 2×2 MIMO, the terminal needs two antennas, which may not be available on all hand-held type of devices. This can be alleviated with use of the intelligent relay. The present intelligent relay is designed to be bigger than the terminal and would easily accommodate multiple antennas.

The intelligent relaying forms an improved link between the BS and the UE as the intelligent relay is fixed. It is preferable therefore to apply a higher order MIMO configuration to the intelligent relaying. Accordingly, intelligent relaying is expected to work well with MIMO configuration in terms of performance and reduced numbers of receiver antennas in the terminal.

Figure 9:
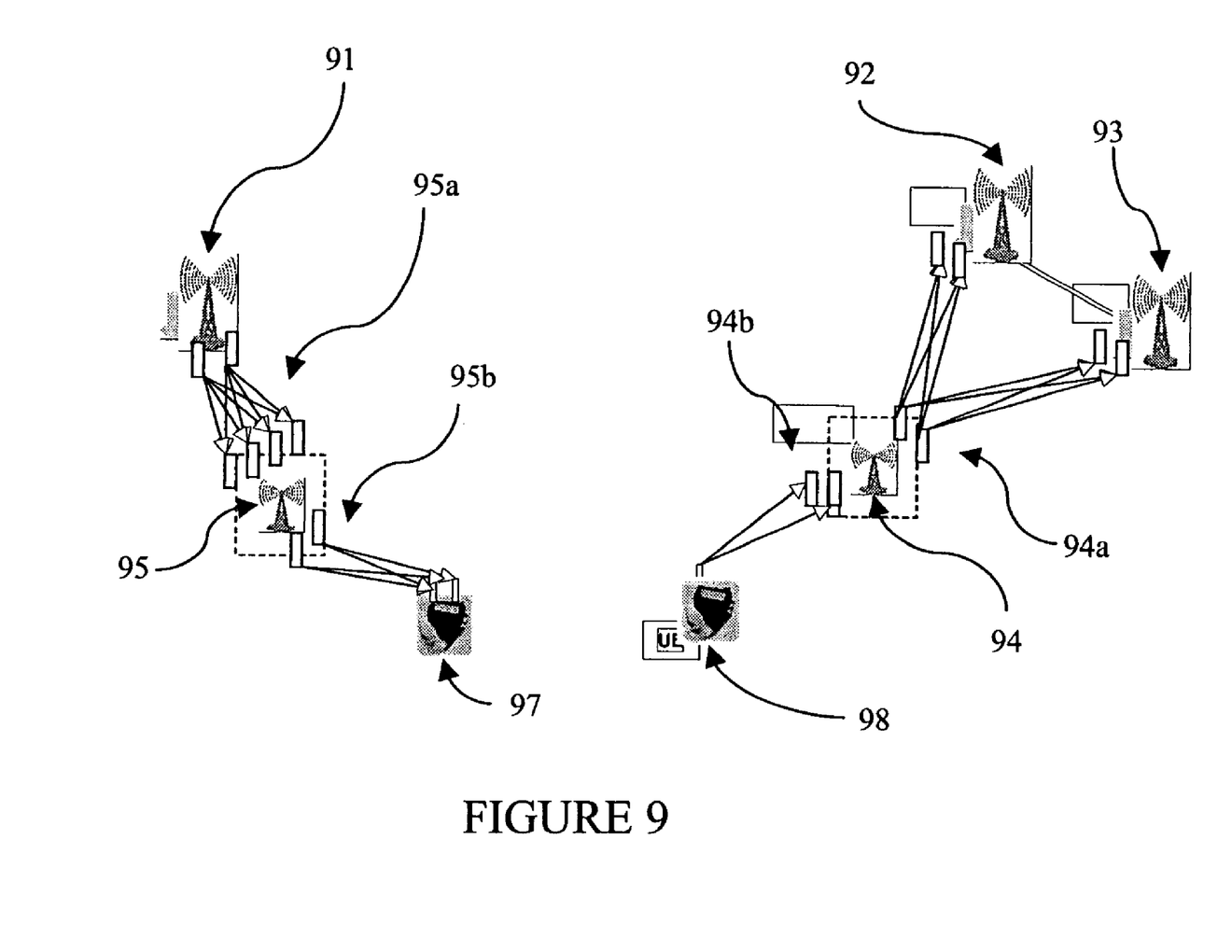
FIG. 9 is a schematic showing the advantage of intelligent relaying in the MIMO environment.

FIG. 9 illustrates the advantage of fixed relaying in the MIMO environment. The left side of the FIG. 9 shows a downlink example where the intelligent relay 95 has 4 receive antennas 95a toward the BS 91, and two transmit antennas 95b toward the UE 97. Without intelligent relaying, the UE would have had a 2×2 MIMO configuration with much longer distance from the BS, and therefore a lower likelihood of realizing the full MIMO capacity gains. With the intelligent relay shown, the BS-relay hop is a 2×4 MIMO configuration with very stable channel condition and the intelligent relay to UE link is a 2×2configuration but with stronger signal due to the short distance between the intelligent relay and the UE. Therefore, the combination of the BS to intelligent relay and the intelligent relay to UE hops would deliver higher data rate than the BS to UE link, by extending the MIMO channel beyond that achieved with a direct BS to UE connection. Note that the number of antennas used here is for illustrative purposes only; any number of antennas could be similarly configured.

On the uplink, shown on the right hand side of FIG. 9, the same benefit would be applicable from the stable channel condition between one or more BS 92, 93 and the intelligent relay 94, and the short distance between the UE 98 and intelligent relay (shown as a single antenna UE only for illustration). In addition, the concept of virtual MIMO for the uplink can be applied to exploit further advantage of the intelligent relaying. In the FIG. 9, the relay may transmit to 2 BSs, to each in 2×2 mode, and with the help of a high speed link between the BS' the incoming signals may be processed collectively to yield effectively a virtual 2×4 MIMO channel. In such instance, intelligent relay 94 would effectively have 2 transmit antennas 94a toward the BSs 92, 93, and two transmit antennas 94b toward the UE 98.

It should be understood that the preferred embodiments mentioned here are merely illustrative of the present invention. Numerous variations in design and use of the present invention may be contemplated in view of the following claims without straying from the intended scope and field of the invention herein disclosed.

Having thus described the invention, what is claimed as new and secured by Letters Patent is:

1. A method of multi-hop relaying within a cellular network having at least one base station, more than one intelligent relays and at least one user equipment element, said method comprising:
selecting a pilot signal emanating from one of said base station or said more than one intelligent relays based upon strength of said pilot signal at said at least one user equipment element;
reporting a strongest source of said pilot signal to said base station;
distributing an active user list, scheduling information, and routing information among said more than one intelligent relays such that said at least one user equipment element is assigned to a corresponding one of said more than one intelligent relays;

transmitting data from said at least one base station to said more than one intelligent relays;

detecting an address of said at least one user equipment corresponding to said data transmitted from said at least one base station; and forwarding said data to said at least one user equipment.

2. The method as claimed in claim 1 wherein said distributing step is performed via a relay control channel.

3. The method as claimed in claim 2 wherein said detecting step is performed at said more than one intelligent relays.

4. The method as claimed in claim 1 wherein said base station includes a means for power control in coordination with rate control wherein said power control means provides for minimization of interference between base station transmissions and relay transmissions.

* * * * *